(12) United States Patent
Wiemker et al.

(10) Patent No.: US 9,269,141 B2
(45) Date of Patent: Feb. 23, 2016

(54) INTERACTIVE LIVE SEGMENTATION WITH AUTOMATIC SELECTION OF OPTIMAL TOMOGRAPHY SLICE

(75) Inventors: Rafael Wiemker, Kisdorf (DE); Harald Sepp Heese, Hamburg (DE); Andre Goossen, Radbruch (DE); Klaus Erhard, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 43 days.

(21) Appl. No.: 14/342,553

(22) PCT Filed: Sep. 3, 2012

(86) PCT No.: PCT/IB2012/054536
§ 371 (c)(1),
(2), (4) Date: Mar. 4, 2014

(87) PCT Pub. No.: WO2013/035026
PCT Pub. Date: Mar. 14, 2013

(65) Prior Publication Data
US 2014/0219534 A1  Aug. 7, 2014

Related U.S. Application Data

(60) Provisional application No. 61/531,666, filed on Sep. 7, 2011.

(51) Int. Cl.
*G06K 9/00* (2006.01)
*G06T 7/00* (2006.01)

(52) U.S. Cl.
CPC ............. *G06T 7/0012* (2013.01); *G06T 7/0081* (2013.01); *G06T 2200/24* (2013.01); *G06T 2207/20101* (2013.01); *G06T 2207/20141* (2013.01); *G06T 2207/30068* (2013.01)

(58) Field of Classification Search
None
See application file for complete search history.

(56) References Cited

U.S. PATENT DOCUMENTS

| | | | | |
|---|---|---|---|---|
| 5,903,664 A | * | 5/1999 | Hartley et al. | 382/154 |
| 2005/0228250 A1 | * | 10/2005 | Bitter et al. | 600/407 |
| 2006/0228009 A1 | * | 10/2006 | Fidrich et al. | 382/128 |
| 2007/0276214 A1 | * | 11/2007 | Dachille et al. | 600/407 |
| 2008/0118134 A1 | * | 5/2008 | Sirohey et al. | 382/131 |
| 2008/0137921 A1 | * | 6/2008 | Simon et al. | 382/128 |
| 2008/0247623 A1 | * | 10/2008 | Delso et al. | 382/131 |

(Continued)

OTHER PUBLICATIONS

Jiang: Multi-Visualization and Hybrid Segmentation Approaches Within Telemedicine Framework; Dissertation, Universitaet Potsdam 2007, Retrieved From the Internet: http:/www.hpi.uni-potsdam.de/fileadmin/hpi/Forschung/Publikationen/Dissertationwn/Diss_Jiang.pdf, on Feb. 8, 2013, 145 Pages.

(Continued)

*Primary Examiner* — Utpal Shah
*Assistant Examiner* — Narek Zohrabyan (57) ABSTRACT

An apparatus for automatic selection of optimal tomography slices by executing a number of tentative segmentations using the same interactively provided in-slice seed point on some or all available tomography slices. The appropriate segmentation boundaries are then marked and the slice with the best segmentation goodness value (figure of merit) is presented to the user via a viewer. The steps are repeated when the user changes the seed point. The optimal segmentation boundary is displayed on top of a single simulated mammography image, fused from all tomography slice images.

13 Claims, 3 Drawing Sheets

(56) References Cited

U.S. PATENT DOCUMENTS

| | | | |
|---|---|---|---|
| 2009/0034684 A1* | 2/2009 | Bernard et al. | 378/98 |
| 2010/0033501 A1* | 2/2010 | Whitesell et al. | 345/634 |
| 2011/0026671 A1* | 2/2011 | Shi et al. | 378/39 |
| 2011/0109650 A1* | 5/2011 | Kreeger et al. | 345/634 |
| 2013/0034278 A1* | 2/2013 | Gindele et al. | 382/128 |
| 2014/0044336 A1* | 2/2014 | Heinlein et al. | 382/132 |
| 2014/0198963 A1* | 7/2014 | Kim et al. | 382/128 |
| 2014/0229881 A1* | 8/2014 | Schadewaldt et al. | 715/771 |
| 2014/0298270 A1* | 10/2014 | Wiemker et al. | 715/849 |

OTHER PUBLICATIONS

Street et al: "Automated Volume Analysis of Head and Neck Lesions on CT Scans Using 3d Level SEET Segmentation", Medical Physics, AIP, vol. 34, No. 11, Oct. 2007, pp. 4399-4408.

Boykov et al: "Interactive Organ Segmentation Using Graph Cuts"; Medical Image Computing and Computer-Assisted Intervention, Feb. 2000, LNCS 1935, pp. 276-286.

Peng et al: "Automated Vertebra Detection and Segmentation From the Whole Spine MR Images", Proceedings of the 2005 IEEE, Engineering in Medicine and Biology, 27th Conference, pp. 2527-2530.

* cited by examiner

INTERACTIVE LIVE SEGMENTATION WITH AUTOMATIC SELECTION OF OPTIMAL TOMOGRAPHY SLICE

CROSS-REFERENCE TO PRIOR APPLICATIONS

This application is the U.S. National Phase application under 35 U.S.C. §371 of International Application No. PCT/IB2012/054536, filed on Sep. 3, 2012, which claims the benefit of U.S. Provisional Patent Application No. 61/531,666, filed on Sep. 7, 2011. These applications are hereby incorporated by reference herein.

FIELD OF THE INVENTION

The present invention relates to an apparatus for post processing 2D cross sectional slice images, to a method for post processing 2D cross sectional slice images, to a medical system for post processing the cross sectional slice images, to a graphical user interface for aiding in post processing 2D cross sectional image slices, to a computer program element and to a computer readable medium.

BACKGROUND OF THE INVENTION

In contrast to conventional x-ray projection images tomography provides a stack of multiple cross sectional slice images corresponding to a certain depth in an imaged volume. The image volume may be a patient or a part of a patient's body which has been examined by a computed tomography scanner. Examples are digital breast tomosynthesis (DBT) in which a number of slices are acquired of a female breast. A frequent task of a medical practitioner such as a radiologist is to review the acquired images for regions of interest, for example a section of a supposed lesion in the breast. There are tools available to request the segmentation of the region of interest identified by the radiologist when reviewing the images. However when there are a large number of slices, handling of such segmentation tools can be difficult.

SUMMARY OF THE INVENTION

It is an object of the present invention to aid the radiologist in retrieving from among a potentially large stack of multiple slice images an image which would afford a better view of the region of interest than the currently viewed slice. The object of the present invention is solved by the subject matter of the independent claims wherein further embodiments are incorporated in the dependent claims.

It should be noted that the following described aspects of the invention apply equally to the graphical user interface generated by the below apparatus, to the method for post processing 2D sectional slice images, to a medical system for post processing the cross sectional slice images, to the computer programme as well as to the computer readable medium.

According to a first aspect of the present invention there is provided an apparatus for post processing 2D cross sectional slice images.

The apparatus comprises:
a graphical user interface controller;
a segmenter unit; and
a goodness of segmentation evaluator.

The graphical user interface controller is configured to generate for display on a screen a graphical user interface. The user interface when so displayed comprises an interactive first window widget displaying on the screen an initial image. The initial image is based on one or more of the 2D slices. The window widget is configured to allow a user to specify position data of a segmentation seed point anywhere on the displayed initial image.

The segmenter unit is configured to access, in response to the user specifying the position data, the 2D slices and to segment each of a plurality of the 2D slices by using the segmentation seed point as a common seed point for each of the segmentations.

The goodness of segmentation evaluator is configured to establish from among the plurality of the segmented 2D slices a best slice having a segmentation with the best goodness of segmentation value. The graphical user interface controller is further configured to update the first window widget to display therein, instead of the initial slice, the best slice or to display therein the best slice with the best segmentation overlaid.

According to one embodiment, the graphical user interface controller is further configured to generate for display on the screen in a second window widget the best segmentation overlaid on a second image based on all or a selection of the 2D slices.

The apparatus according to a present invention saves the radiologist from the tedious task of having to scroll through all the slices in order to find the most suitable for segmentation. The apparatus allows the user to interactively requests a segmentation at a certain in-slice position and helps remove the ambiguity whether the segmentation at this in-slice position would be more "meaningful" in a different slice than the currently displayed one.

According to one embodiment of the invention a number of tentative or sample segmentations are carried out using the same interactively provided in-slice point. The in-slice point is user provided by using a pointer tool such as a computer mouse. The sample segmentations are carried out for each or a user-definable selection of the slices in the stack or for one or more sliding average slabs obtained from different groups of slices. Each of the automatically generated segmentation yields a goodness of segmentation value.

The slice with the best segmentation goodness value is automatically, without further user interaction, brought to the foreground of the slice viewer preferably in a smooth fade-in. In the graphical user interface the segmentation that was determined to have the highest goodness of segmentation value is shown marked so as to better stand out to the eye of the user.

The feedback of providing the best slice having the best segmentation overlaid is repeated interactively in response to changes of mouse cursor position as requested by the user. Mouse click events are no longer necessary. The request to have the best slice with the best segmentation value re-calculated is effected by dispatching only the updated position as recorded and registered by the computer mouse and interpreted by the graphical user interface controller.

According to one aspect of the present invention, the optimal segmentation boundary is additionally displayed on a single simulated mammography image obtained by fusing all or a selection of the tomography slices. According to one aspect of the present invention the slice-wise segmentation is based on a shortest-closed-path algorithm using a cost function inverse to the radial grey value gradient with respect to the seed point.

Using such a cost function allows focusing the search for segmentation boundaries circumscribing high contrast image regions.

According to one aspect of the present invention, the segmentation can be controlled via a preferred mean radius and a preferred mean grey value or mean gradient.

According to one aspect, the preferred mean radius and the desired grey values, either for the mean or for the gradient, are provided in a preparatory configuration step by the user. Imposing such constraints on the sample points allows saving CPU time when calculating the best segmentation.

As used throughout the invention, "best" slice and the "best goodness of segmentation value" is objectively established by predetermined image contrast criteria as explained below. In general, the best slice will be one in which the pixel or voxel values inside the requested segmentation are at a higher contrast to pixel or voxel values outside the segmentation as compared to when that segmentation would have been taken in the slice currently viewed. The best or a better segmentation in the best slice makes the region of interest as outlined by the segmentation's boundary stand out better to the eye of the radiologist when viewing the image. By gradually fading into the screen the best slice, optionally with the best or a better segmentation overlaid, prevents "information overload" to the radiologist. During the ongoing fade-in of the second image and the gradual disappearance of the initial slice, the user can still compare the visual appearance of the region of interest in the initial slice with the now segmented region of interest in the best slice as it builds up.

According to one embodiment, the first window widget is updated upon user changing the mouse position in the window to display the best slices according to the current mouse positions. Upon user request, the best slice is displayed with or without the best segmentation overlaid.

According to another embodiment, graphical user interface controller controls a further window widget along with first window widget displaying the best slice, the further window widget displaying an overview image such as a simulated mammogram obtained from the slices. Upon user request, the mammogram is displayed with or without the best segmentation overlaid according to the current mouse position. When the window widgets are controlled, mouse positions recorded in either of the two widgets trigger an update of the segmentations.

The simultaneous display of the segmentation result in the best slice and on top of the simulated mammogram provides a training environment for radiologists to obtain experience with a new DBT modality and to get acquainted with different visual appearances of malignancies within mammography and DBT.

BRIEF DESCRIPTION OF THE DRAWINGS

Exemplary embodiments of the invention will be described in the following with reference to below drawings in which.

DETAILED DESCRIPTION OF EMBODIMENTS

Figure 1:
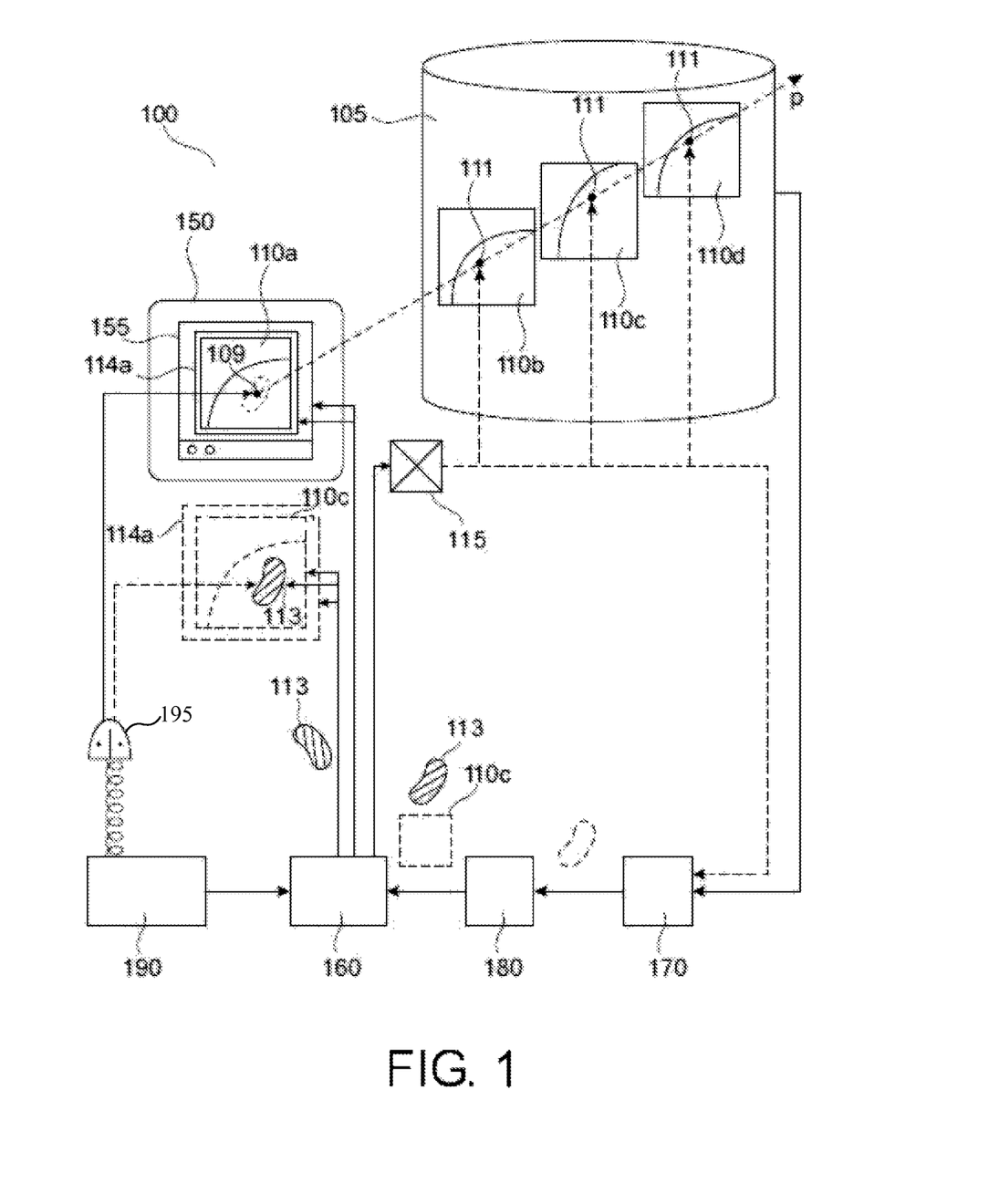
FIG. 1 schematically shows a block diagram of an apparatus for post processing 2D cross sectional slice images.

With reference to FIG. 1 the 2D post processing apparatus comprises a database 105 holding 2D cross-sectional slices 110a-d. Slice 110a is displayed in a graphical user interface 155 on a computer screen 150. The visual appearance of and the user interaction functionalities provided by the graphical user interface (GUI) 155 is controlled by GUI controller 160.

The apparatus further comprises a segmenter unit 170 and a goodness of segmentation evaluator 180. There is a processing unit 190 such as a workstation in communication with segmenter 170, evaluator 180 and GUI controller 160. There is a pointer tool such as computer mouse 195 in communication with processing unit 190 to allow user interaction with GUI 155 via GUI controller 160. The apparatus further comprises a back-tracer 115.

Broadly speaking, the apparatus in FIG. 1 aids a radiologist to retrieve a slice, say slice 110c, from among the slices 110b-d held in the database 105. The retrieved slice 110c affords a better or "best" view on a region of interest than shown on initial slice 110a. GUI 155 as controlled by GUI controller 160 allows interactive on screen 150 image data presentation: a current position 109, user-specified by using mouse 195 in the initial image 110a, is back-traced by back-tracer 115 in each or a selection of the slices 110b-d held in database 105. User specified initial point 109 is translated by back tracer 115 into a common seed point to be used for automatic segmentation carried out by segmenter 170. The segmentation is automatic in that the user will need only specify the initial in-slice point 109. Evaluator 180 then establishes among the automatically segmented slices 110a-d the slice having the best or a better segmentation goodness value. In FIG. 1 it is slice 110c that has been established to be the best slice because its segmentation 113 was evaluated by evaluator 180 to have the best goodness of segmentation value as compared to the segmentations of the remaining slices 110a-d. The initial slice 110a is included in the automatic segmentation and goodness of segmentation value evaluation. An outlined contour or boundary 113 of the best segmentation is then displayed overlaid on the best slice 110c which is then displayed instead of the initial image 110a on the computer screen 150.

According to one embodiment the best segmentation is additionally overlaid on a simulated mammogram 112 (see FIG. 2) obtained from the slices 110a-d.

The collection or "stack" of two dimensional cross sectional slices 110a-d can be obtained by using image date acquired by an imaging modality during a digital breast tomosynthesis (DBT) scan. According to one embodiment the digital image format is DICOM. Each of the image slices 110a-d is two dimensional because it is defined by an array of pixel or voxel image elements. Each pixel or voxel encodes a grey scale value. The grey values can be accessed or addressed by co-ordinates x, y defining the array. Each of the slices 110a-d has been acquired at a certain "depth" along a patient's longitudinal axis z during the scan or in the case of DBT at a projection angle alpha. Reconstruction algorithms implementing different projection types and projection directions can then be used to generate different stacks of 2D slices from the original stack 110a-d at different perspective views across slices. Slices 110a-d are related by parallel projection as indicated in FIG. 1 by dashed arrow p. Suitable algorithms to generate different perspective views are filtered back-projection or iterated reconstruction techniques. The simulated mammogram 112 for as an overview image may be obtained by forward projecting the reconstructed 3D volume along the normal of the detector in the X-ray scanner.

The "best" slice 110c as established by evaluator 180 affords a better view on a region of interest when compared to the segmentation in initial image 110a. The medically relevant structure or region of interest represented by the segmentation therefore stands out better to the eye of the radiologist when viewing the best slice on screen 150. The region of interest may be sections of a tumor in a female breast.

The components of the apparatus are shown spread out in FIG. 1. However, this is for clarity of illustration. The apparatus components GUI controller 160, segmenter 170, evaluator 180 and the processing unit 190 may be indeed locally distributed and connected in a suitable communication network. In other embodiments however the components 160, 180 and 170 are running as software routines on the processing unit 190. Controller 160, segmenter 170 and evaluator 180 may also be arranged as dedicated FPGAs or hardwired standalone chips. The components may be programmed in a suitable scientific computing platform such as Matlab® or Simulink® and then translated into C++ or C routines maintained in a library and linked when called on by processing unit 190.

Operation

Upon start up, the radiologist is presented with a graphical user interface 155 including a vacant window widget 114a. The radiologist then initiates accessing database 105 to load slice 110a for viewing into window widget 114a of GUI 155.

To this effect the radiologist either hits a key on a keyboard connected to processing unit 190 or uses mouse 195 to actuate a load button 205 (see FIG. 2) of GUI 155. GUI controller 160 then accesses via suitable database interface means slice 110a for viewing or initiates generation of a simulated mammogram obtained from the collection of slices 110a-d. The initial slice 110a or the simulated mammogram is then displayed in widget 114a as the initial image.

The radiologist can then use mouse 195 to move mouse pointer 195a (see FIG. 2) across the initial image in widget 114a to specify an initial segmentation seed point 109 inside the region of interest. Upon key stroke or double mouse click the GUI controller 160 changes from idle mode to retrieve mode. The position data as generated by mouse 195 at the currently specified position 109 is then passed to back-tracer 115.

Back-tracer 115 back-traces the initial seed point 109 across all or a selection of slices 110b-d to establish in each or in the mammogram 112 a projection of the initial point 109 as a common seed point 111. The common seed point is a collection of points in each slice, each being a projection of initial point 109 in that slice. Because the projection is unique, the collection can be referred to in singular as "the common seed point" 111. According to one embodiment GUI 155 provides a "CONFIG" button 210 (see GUI view in FIG. 2) which allows the user to specify for which ones of slices 110b-d he wishes the common seed point 111 to be established. For example, to save CPU time back-tracing might be performed only for slices acquired at certain acquisition time or may be restricted to a specified alpha value range. In this way the radiologist can focus the retrieval on selected ones of slices that appear to him to be most likely to show the best representation of the region of interest.

Operation of back-tracer 115 to establishes the common seed point across slices 110b-d depends on whether best segmentation 113 is to be displayed on best slice 110c or on the mammogram reconstructed from slice 110a-d. Back-tracer 115 operation further depends on whether slices 110a-b have been acquired by a single beam or cone-beam (as used in tomosynthesis) imaging modality.

In case only the best slice 110c is displayed and for slabs or parallel projections perpendicular to the slices 110a-d, back-tracer 115 identifies by a ray p (see FIG. 1) mapping the 2D position 109 in the 'initial image' 112 with the 2D position in each of the 2D slices 110a-d. Back-tracer 115 is configured to read off DICOM data in header files of slices 110a-d to establish whether the projection used for the reconstruction of the slices 110a-d was perpendicular or not.

In case segmentation 113 is displayed on the mammogram 112 or for cone beams or for slices obtained by parallel projections not perpendicular to the 2D slices 110a-d, back-tracker 115 uses linear or affine transformation that are target slice dependent. More specifically, for cone beams perspective projections are used. Back-tracer 115 applies the target slice dependent transformation slice by slice from the initial slice 110a to the mammogram or to any one of the target slices 110b, c or d, one at a time to so establish the 'correct' common seed point in the mammogram or any one of slices 110b, c or d.

The linear transformations are determined by the mutual position, shift and rotation of the slices 110a-d and the position of the target slice 110b, c, d relative to initial slice 110a. In case of the mammogram as represented on a projection plane, the linear transformation is further determined by the beam type, single or cone beam, used for the projection. When perspective projection is to be used, back-tracer 115 further registers the distance between the mammogram projection plane and the projection source. Back-tracer 115 establishes projection source distance by accessing the DICOM metadata where the distance for each slice to the X-ray source of the acquiring imaging modality is recorded. The above position data can be expressed in a common coordinate frame using the DICOM position data. Back-tracer 115 then uses the position data to calculate coefficients for the target specific linear transformation to be used. The coefficients are a function of the projection direction, the dot product between projection direction and the normal of the plane defined by any of the slices, and, for the mammogram case, the distance between target slice and initial slice.

The initial segmentation seed point 109 can be specified by the radiologist by means of the mouse anywhere on the initial slice 110a shown on screen 150. There is no machine-side pre-selections imposed on user to make the choice for the initial segmentation seed point. After back-tracer 115 established the co-ordinates of the common seed point 111 across each of the slices, program flow passes on to segmenter 170.

Segmenter 170 establishes for each slice 110b-d a boundary for the segmentation around the common seed point 111. The segmentation boundary is a polygonic path. To define the in-slice boundary segmenter 170 for each slice 110b-d establishes in a preparatory step a number of boundary sample points grouped in a selectable and configurable manner around the common seed point 111. To do this, initial sample points are defined by the user or a random generator around initial point 109 in initial slice 110a. The relative positions between the initial sample points and the initial point 109 in initial slice 110a are recorded and applied by back-tracer 115 to each of slices 110b-d to obtain copies of the initial sample points in each slice 110b-d. The relative positions between sample points and the respective common seed point in any one of slices 110b-d are therefore identical to those in initial slice 110a.

The user can in a configuration step select and impose restrictions on the sample points to be taken into consideration by segmenter 170. According to one embodiment the sample points around the common seed point are so chosen as to be all inside a circle with a pre-set mean radius. In another embodiment or in addition to the mean circle restriction, sample points are so chosen that the grey value gradient at each of the points or the average of all gradients is above a pre-determined mean value. Mean circle radius and average grey value gradient can be configured by using the configuration functionality accessible by clicking on the "CONFIG" button 210.

Segmenter 170 then solves for each slice across the plurality of so selected sample points a closed path problem using a cost function.

According to one embodiment the cost function used for the closed path problem is inverse to the radial grey value gradient with respect to the common seed point 111. Each of slices 110a-d defines a mapping (x, y)→g where each pixel or voxel element at position x, y in the slice has grey scale value g assigned to it. The gray value gradient is then the gradient taken with respect to this mapping and points at each point x, y in the plane of the slice along the direction of the greatest rate of change in grey values across the slice.

The gradient at the common seed point is then projected to each one of the in-slice vectors pointing from the common seed point to any one of the sample points any projection taken at a time for each sample point. The respective absolute values of the components of the gradient along any one of the in-slice vectors for each sample point are then used as a "cost" for that sample point in the cost function. Each sample point is associated or "loaded" with a "cost" defined by the absolute value of the directional component of the gradient along the vector from the common seed point to that sample point.

The cost weight is a measure for the contrast between grey values at that sample point. Because the cost function is inverse to the gradient, the cost function penalizes sample points in low contrast regions and rewards sample points in high contrast regions. The segmenter favors those sample points in high contrast regions as solutions because least costs are incurred. A selection of the sample points incurring the least cost is then established as a solution to the shortest closed path problem. These sample points demark the boundary of the automatically generated segmentation.

The user can in a configuration step select and impose a restriction on the sample points to be taken into consideration when solving for the sample points incurring least cost. According to one embodiment the sample points around the common seed point are so chosen as to be all inside a circle with a pre-set mean radius. In another embodiment or in addition to the mean circle restriction, sample points are so chosen that the grey value gradient at each of the points or the average of all gradients is above a pre-determined mean value. Mean circle radius and average grey value gradient can be configured by using the configuration functionality accessible by clicking on "CONFIG" button 210. After the segmentation of the slices 110b-d, program flow passes over on evaluator 180.

In evaluator 180, for each segmentation in the respective slice 110b-d, a goodness of segmentation value is established. To this end, according to one embodiment, the grey value gradient at each boundary point on the segmentation boundary is taken. The boundary point gradients are still known from the earlier segmentation at segmenter 170. The boundary point gradients are then summed for each boundary point on the boundary to obtain the goodness of segmentation value.

According to one embodiment the boundary point gradients are averaged, to obtain the goodness of segmentation value. The maximum of the so calculated segmentation values is then established. The slice 110c that yields the best segmentation value is then registered as the "best slice". If there are more than one best segmentation values a random generator is used to establish the single best segmentation value and the single best slice. For retrieval purposes, a reference to the best segmentation along with a reference to the best slice 110c having the best segmentation value is then passed back to GUI controller 160.

GUI controller 160 then interfaces with the video card in processing unit 190 (not shown) to display either the best slice 110c or a simulated mammogram 112 obtained from slices 110b-d. Best slice 110c is then faded-in for display in a window widget 114a to effect a gradual transition from currently shown slice 110a to best slice 110c. The fading-in is schematically shown in FIG. 1 where window widget 114a is drawn in dashed lines. Depending on user request or configuration, best segmentation 113 is or is not displayed as an overlay on now displayed best slice 110c.

According to one embodiment, a second window widget 114b (see FIG. 2) is displayed along with first window widget displaying therein the mammogram 112. Depending on user request or configuration, best segmentation 113 is or is not displayed as an overlay on mammogram 112 in second window widget 114b. GUI controller 160 interfaces with event listeners to establish whether user has changed the mouse cursor 195a position from the current initial seed point position 109 to a new seed point position.

According to one embodiment, if event listener intercepts a new position, the new position is then used to establish a new common seed point and a new best slice and a new best segmentation is established by segmenter 170 and evaluator 180. GUI controller 160 then updates first widget 114a by fading-in the new best segmentation.

According to one embodiment the user does not have to double click to recalculate the segmentation and evaluation with respect to the new position. The event listener in the graphical user interface controller 160 is so configured to listen only to position data generated in the mouse and not to associated mouse click events. In this way GUI controller 160 implements an easy to use zero-click "live" segmentation functionality. Radiologist can have his mind focused fully on image interpretation with least distraction.

Figure 2:
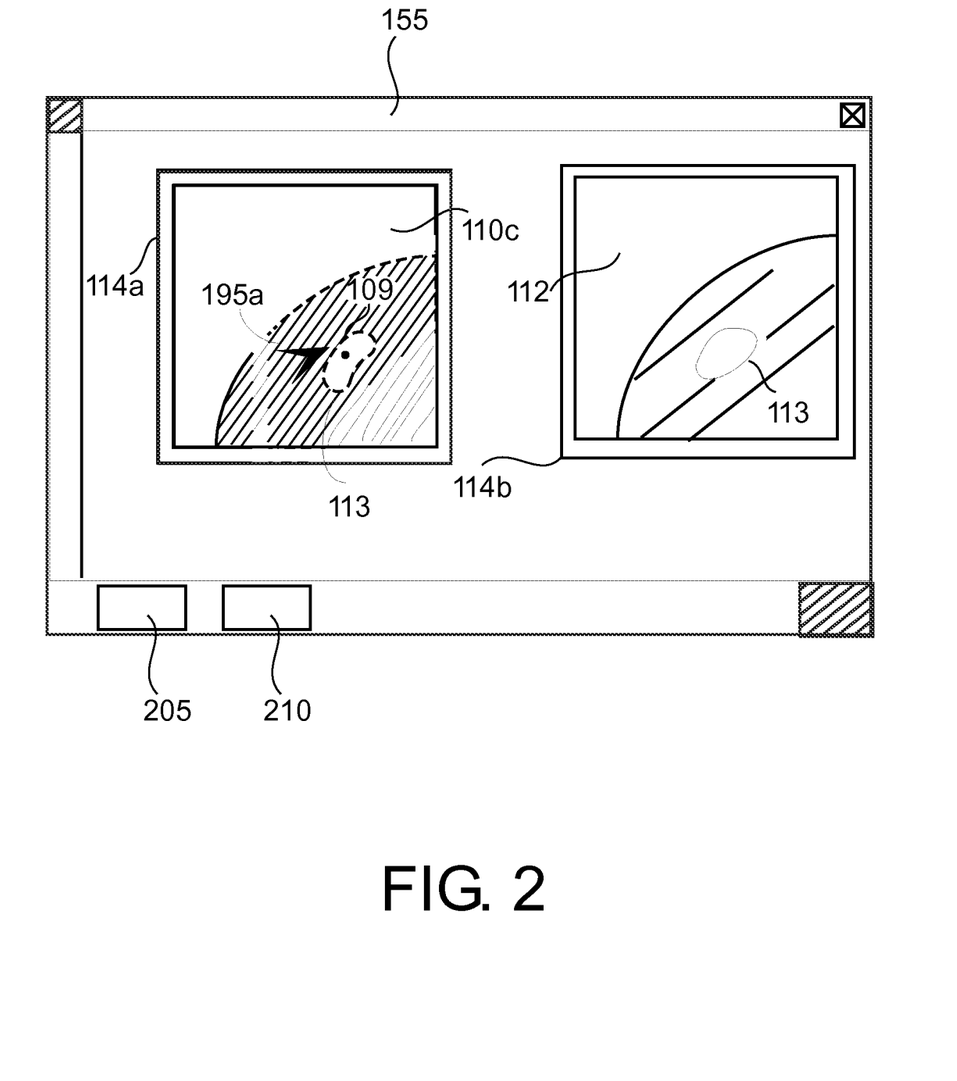
FIG. 2 shows a graphical user interface for post processing 2D cross sectional slice images.

FIG. 2 shows a more detailed view of the graphical user interface 155 when controlled by the graphical user interface controller 160 and displayed on the screen 150. In the embodiment shown in FIG. 2, second window widget 114b shows as an overview image the mammogram 112 with the best segmentation 113 overlaid. The first window widget 114a is shown after fade-in of the best slice 110c has completed. Faded-in best slice 110c has likewise its best segmentation 113 overlaid. As best slice 110c is gradually being build-up whilst being faded-in, previously displayed slice 110a is faded-out from first window widget 114a until best slice 110c is displayed in the foreground and has completely replaced previous slice 110a. GUI 155 defined by a container widget shows along its lower horizontal edge a tool bar comprising the "LOAD" 205 button and the "CONFIG" 210 button mentioned earlier. The load button 205 allows loading the initial image 110a or the mammogram to be viewed. "CONFIG" button 210 when actuated by mouse click effects display of a pop-up configuration window (not shown in FIG. 2) for the user to specify the number of sample points and thereby control the resolution of the polygonic boundary in the automatic segmentation. The user can further specify the mean radius of the circle containing all the sample points.

Initially, when viewing the initial image the mouse pointer 195a can be moved around without the automatic segmentation to be executed. After the user has settled on the position he wishes segmentations to be calculated around he hits a key on the keyboard connected to the processing unit 190. The apparatus then enters into the retrieve mode and execution of the calculations commences. From then on, if no switching back to idle mode is desired, the user is no longer required to hit any key. He or she simply moves the mouse to a new position in either of first 114a or second 114b window widget and the graphical user interface interprets this change of position as a new request for a new segmentation using a new position as a new initial seed point.

Window widget 114a will then be updated yet again by fading-in the new best slice, with or without the best segmentation overlaid. If mammogram 112 is displayed in second window widget 114b, the second window widget is likewise updated by fading-in new best segmentation overlaid on mammogram 112 and fading-out previous best segmentation 113.

Figure 3:
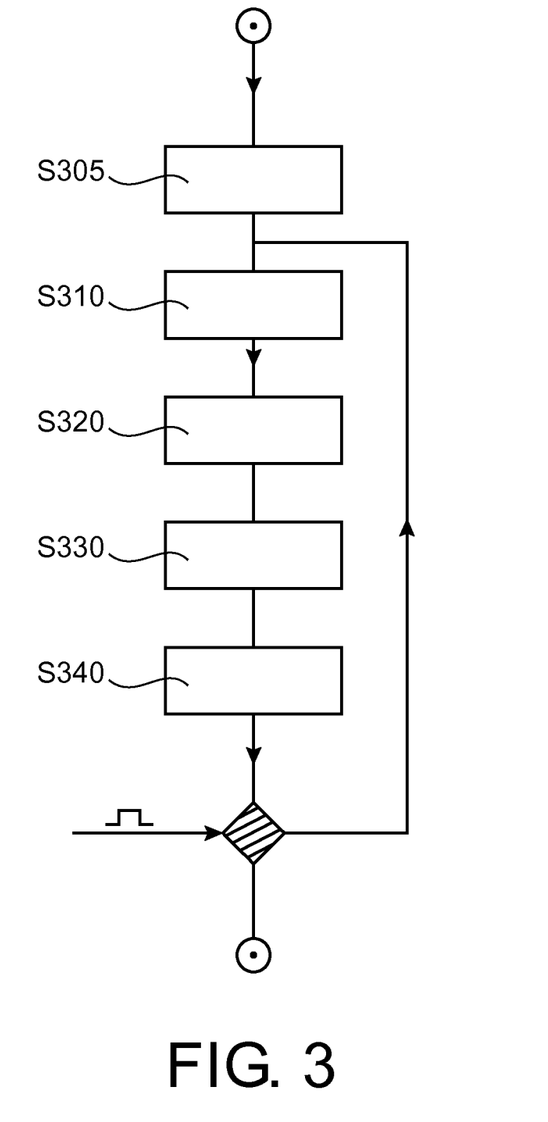
FIG. 3 schematically shows a flow chart for a method of post processing 2D cross sectional slice images.

With reference to FIG. 3 there is shown a flow chart for the method of post processing the 2D cross sectional slice images.

In step S305, the first window widget is displayed on a screen displaying an initial image based on one or more of the 2D slices.

In step S310 position data of a segmentation seed point anywhere on the displayed initial image is received by user action.

In step S320 each or a selection of the plurality of the slices is segmented by using the received seed point in step S310 as a common seed point for each of the segmentations.

In step S330 the best slice from among the plurality of segmented 2D slices is established. The best slice has a segmentation with the best goodness of segmentation value.

In step S340 best slice is faded-in for display on first window widget to replace previously displayed initial slice. According to user request, best segmentation is or is not shown overlaid on best slice in first window widget. According to one embodiment, a mammogram reconstructed from the stack of slices is displayed in a second window widget alongside the first window widget. According to user request, best segmentation is or is not shown overlaid on mammogram in second window widget.

According to one embodiment of the present invention step S320 includes the step of receiving a plurality of sample points. For each, or a configurable selection of the plurality of the 2D slices a shortest closed path problem is solved across the plurality of the sample points. The shortest closed path problem uses a cost function inverse to radial grey value gradient with respect to the common seed point. The common seed point is inside any one of the closed paths so calculated. A selection of the sample points is then output as a solution to the shortest closed path problem. The output sample points make up a boundary of the respective segmentation.

According to one embodiment of the present invention, step S320 includes calculating for at least two slices from the segmented slices a goodness of segmentation value for the segmentations in each of the two slices. According to one embodiment the calculation is carried out by summing the grey value gradients in the slice at the segmentation boundary. According to one embodiment, in addition or instead of the summing a mean value of the projection of the green value gradient in the slices is established. The values so obtained are then compared and the best segmentation value is registered along with its slice.

Upon user request by specifying a new position for the initial seed points, the steps S310 to S340 are repeated using the new initial seed point and a new best segmentation is displayed in a new window widget.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an update turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combina-

The invention claimed is:

1. An apparatus for post-processing 2D cross-sectional slice images, the apparatus comprising:
a processor, including:
a graphical user interface controller;
a segmenter unit; and
a goodness of segmentation evaluator;
wherein the graphical user interface controller is configured to generate for display on a screen a graphical user interface, the user interface when so displayed comprising an interactive first window widget displaying on the screen an initial slice based on one or more of the 2D slices, the window widget configured to allow a user to specify position data of a segmentation seed point anywhere on the displayed initial slice;
wherein the segmenter unit is configured to access, in response to the user specifying the position data, the 2D slices and to segment each of a plurality of the 2D slices by using the segmentation seed point as a common seed point for each of the segmentations;
wherein the goodness of segmentation evaluator is configured to establish from among the plurality of the segmented 2D slices a best slice having a segmentation with a best goodness of segmentation value; and
wherein the graphical user interface controller is further configured to update the first window widget to display therein, instead of the initial slice, the best slice or to display therein the best slice with the best segmentation overlaid or to generate for display on the screen in a second window widget the best segmentation overlaid on a second image based on all or a selection of the 2D slices.

2. The apparatus according to claim 1, wherein the second image is a simulated mammography image generated by forward projecting a 3D volume reconstructed from all or a selection of the 2D slices.

3. The apparatus according to claim 1, wherein the first window widget is updated by fade-in of the best slice.

4. The apparatus according to claim 1, wherein the position data of the common segmentation seed point is acquired by a user specifying with a pointer tool a position on the displayed first slice or on the displayed second image and, when the user specifies a new pointer position for a new common seed point, using the new common seed point to re-segment and re-establish a new best slice and a new best segmentation and then update the first window widget by displaying the new best slice instead of the previously displayed best slice or by displaying the new best slice with the new best segmentation overlaid or by overlaying the new best segmentation on the second image in the second window widget.

5. The apparatus according to claim 4, wherein the pointer tool is a computer mouse and wherein the specifying of the position data or the new position data is effected without using a mouse click event but by using position recordings generated by the mouse as the mouse is moved by the user.

6. The apparatus according to claim 1, wherein the processor comprises a back-tracer to back-trace the segmentation seed point across the plurality of the 2D slices by using a projection mapping to project the segmentation seed point into each one of the plurality of 2D slices thereby forming the common seed point, the back-tracer configured to read out metadata from the 2D slices and to change the projection mapping in dependence on the read out metadata.

7. A method of post processing 2D cross-sectional slice images, the method comprising:
displaying in a first window widget on a screen an initial image based on one or more of the 2D slices;
receiving position data of a segmentation seed point anywhere on the displayed initial image;
segmenting each of a plurality of the 2D slices by using the received seed point as a common seed point for each of the segmentations;
establishing from among the plurality of the segmented 2D slices a best slice having a segmentation with a best goodness of segmentation value; and
displaying on the screen in the first window widget the best slice or displaying in the first window widget the best slice with the best segmentation overlaid.

8. The method according to claim 7, further comprising; displaying along with the first window widget a second window widget displaying therein an overview image having the best segmentation overlaid on same.

9. The method according to claim 7, wherein the segmenting into segments comprises:
receiving a plurality of sample points;
in each one of the plurality of 2D slices, solving across the plurality of the sample points a shortest-closed-path problem using a cost function inverse to a radial grey value gradient with respect to the common seed point, the common seed point being inside any one of the closed-paths; and
outputting a selection of the sample points as a solution to the shortest-closed-path problem, the outputted sample points making up a boundary of the respective segmentation.

10. The method according to claim 9, wherein the received plurality of the sample points are selected
i) to define as a whole a pre-determined mean radius around the common seed point; and
ii) to yield in total at least a pre-determined mean grey value or mean grey value gradient.

11. The method according to claim 7, wherein the establishing of the best goodness of segmentation value comprises:
for at least two slices, calculating for each a goodness of segmentation value for the segments in each one of the at least two slices, the calculating step comprising:
along a or the segmentation boundary, summing the projection of the gray value gradient in the slice; and/or
along the segmentation boundary, establishing the mean of the projection of the grey value gradient in the slice; and
after calculating the goodness of segmentation value,
comparing the values to establish a best segmentation value; and
selecting the slice having the best or a better segmentation value.

12. Method according to claim 7, wherein the 2D slices are digital breast tomosynthesis (DBT) slices.

13. A non-transitory computer readable storage medium having stored thereon a computer program element for controlling an apparatus which, when executed by a processing unit, is adapted to perform the steps according to claim 7.

* * * * *